United States Patent Office 3,504,426
Patented Apr. 7, 1970

3,504,426
PROCESS FOR BONDING
Richard A. Craig, Hartford, John W. Lane, Manchester, and Robert L. Light, Jr., East Hartford, Conn., assignors to United Aircraft Corporation, East Hartford, Conn., a corporation of Delaware
No Drawing. Original application Oct. 22, 1964, Ser. No. 405,836. Divided and this application June 9, 1967, Ser. No. 656,973
Int. Cl. B23k 31/02
U.S. Cl. 29—473.1        13 Claims

ABSTRACT OF THE DISCLOSURE

Non-metallic refractory materials and refractory metals can be bonded to refractory metals by placing a bonding alloy composition between the two layers to be bonded to form a bonding assembly. The bonding alloy composition consists essentially of from 7–45 atomic percent of molybdenum, from 1.5–15 atomic percent in the aggregate of a metal selected from the group consisting of tantalum, columbium, and mixtures thereof, and the balance essentially zirconium with the zirconium content of the alloy being not less than 50 atomic percent of the total composition. The bonding assembly is heated to a diffusing temperature and then to a flow temperature sufficient to melt the bonding alloy. In a typical example, a tungsten-rhenium alloy plate (W–26Re) and a tantalum plate are bonded to opposite sides of a beryllium oxide plate using a bonding alloy having the following composition in atomic percentages: 7 percent tantalum, 36 percent molybdenum, and 57 percent zirconium.

---

This is a division of application Ser. No. 405,836, filed Oct. 22, 1964, now abandoned.

This invention relates to novel and improved bonding alloys for forming high-strength, high-temperature bonds, and to a method for bonding nonmetallic refractory members to metal members and metal members to metal members.

More particularly, this invention relates to a bonding alloy which, in the molten state, is characterized by excellent wettability and flowability and which is capable of forming a strong, high-temperature bonded joint between a nonmetallic refractory member and a metal member. The invention also releates to a process for creating a bonded trilayer comprising a nonmetallic refractory, such as beryllium oxide, bonded to and interposed or sandwiched between two metal members, each of which consists essentially of a refractory metal or alloy thereof. The bonds of the trilayer are characterized by their ability to retain high strength at high temperatures.

The invention further particularly relates to a process for forming a trilayer comprising a beryllium oxide refractory member interposed between two refractory metal members. The process includes the steps of placing a bonding alloy composition between the beryllium oxide member and each of the adjacent metal members, heating the trilayer assembly so formed to a diffusing temperature that is below the flow temperature of the bonding alloy composition, subsequently heating the assembly to the flow temperature of the bonding alloy composition, and finally cooling the assembly to provide a trilayer having a strong adherent high-temperature bond.

In the description of this invention which follows, it will be understood that the term "refractory metals" refers to those metals with melting points equal to or higher than that of chromium, or higher than 3407° F. (1875° C.). So defined, the refractory metals of this application in ascending order of their melting points are thus: chromium, vanadium, rhodium, hafnium, ruthenium, columbium, iridium, molybdenum, tantalum, osmium, rhenium, and tungsten.

Trilayers made possible by the bonding alloys of this invention are particularly useful with thermionic converters. A thermionic converter is a device that accepts heat at a high temperature, rejects heat at a lower temperature, and generates electrical energy. Each thermionic converter has two electrodes, an emitter and a collector. The emitter receives heat and generates or emits electrons. Emitted electrons are transported through an interelectrode spacing between emitter and collector and are collected by the collector. The collector also acts as a heat sink for heat rejected from the converter. After being collected at the collector, electrons are returned to the emitter through an external electric load, where the electrical energy of the flowing electrons may be converted into mechanical energy or otherwise used to do work.

Coupling of nuclear reactors with thermionic converters makes it possible to transform nuclear heat directly into electricity without an intermediate step of conversion into mechanical energy. Existing and anticipated advances in high-temperature nuclear fuels and thermionic converters show promise of achieving a successful merging of the two concepts of a nuclear reactor and a thermionic converter into a single device—a nuclear thermionic reactor. Such a device would possess novel features that would make it particularly useful for a number of special applications for which no prior device has existed.

Thermionic nuclear reactors would be highly desirable in space applications, because they can convert heat directly into electricity without moving parts. Moreover, when a thermionic converter is combined with a nuclear reactor, completely silent operation can be achieved. A compact and efficient thermionic nuclear power plant would thus be of great value in submarine propulsion.

Another feature of thermionic nuclear reactors which makes them particularly attractive for applications in space is their ability to reject heat at the relatively high temperature level of 1000° K. This results in appreciable savings in weight and surface area of the radiator.

A still further advantageous attribute of thermionic nuclear reactors is their ability to operate practically maintenance free for long periods, because they include no moving parts. This attribute is almost an indispensable requirement for uses in space and remote areas.

A "trilayer" is an essential element of every thermionic converter, no matter what the heat source. As used herein, the term "trilayer" refers to a composite assembly comprising a nonmetallic refractory member, or layer, interposed between two metal members with the nonmetallic refractory member tightly and strongly bonded to each of the metal members. In its general concept and form a trilayer is thus essentially three stacked layers comprising a nonmetallic refractory member sandwiched between two metal members.

With thermionic nuclear reactors a trilayer is necessary whether the heat source is in-pile or out-of-pile. When it is out-of-pile, the trilayer is on the emitter side of the converter, and when it is in-pile, the trilayer is on the collector side of the converter. The emitter side of the converter necessarily operates at a higher temperature than the collector side, because the emitter receives heat while the collector rejects it at a lower temperature. As might be expected, the greatest problems with trilayers are accordingly encountered when the trilayer is on the emitter side.

The best known materials for emitters and collectors are the refractory metals and their alloys. When the converter is out-of-pile, the trilayer is on the emitter side of the converter and the inner metal member of the trilayer serves as a containment vessel or pipe for liquid metal in the reactor loop while the outer metal member serves as the thermionic emitter. When the converter is in-pile, the trilayer is on the collector side and the outer metal member of the trilayer serves as the container for reactor fuel elements while the inner metal member serves as the thermionic collector. In either form of thermionic converter, in-pile or out-of-pile, it is essential that the two metal members of the trilayer be electrically but not thermally insulated from one another. Two characteristics are thus imperative, if the nonmetallic refractory member or middle layer of the trilayer is to be effective. It must:

(1) have excellent electrical resistance, and
(2) exhibit good heat transfer characteristics.

It has been acknowledged by the prior art for some time that the entire concept of a thermionic conversion system for use with nuclear reactors has been dependent upon the development of a suitable high-temperature, metallurgical bonding alloy. Such a bonding alloy would have to be capable of forming a strong, heat-resistant bond between a refractory metal member and a nonmetallic refractory member that combines excellent electrical resistance with good heat conductance.

Prior to this invention, it had also been acknowledged by the prior art that there was no satisfactory bonding alloy that possessed the special properties required. What was needed was a bonding alloy:

(1) that would effect a strong and adherent bond between the nonmetallic electrical insulator and the refractory metal members forming the emitter (or the collector) and the walls of the containment vessel;
(2) that would retain its strength and adherency at high temperatures;
(3) that would create an effective and uniform bond over relatively large areas; and
(4) that would yield good heat conductivity.

Preferably, the alloy would also exhibit excellent wettability and flowability characteristics when used both with the refractory metal members and the nonmetallic insulating member. The present invention provides such a bonding alloy.

For operation with many thermionic converters the bonding alloy of this invention must maintain its effectiveness at temperatures up to at least 3000° F. Many earlier attempts to develop bonding alloys for use at such temperatures met with failure because the alloys used vaporized at the low pressures and high temperatures of the usual thermionic converter environment. For example, most thermionic converters are designed to operate at pressures as low as .001 micron of mercury.

Attempts have been made in the past to use titanium base bonding alloys, but titanium has proved to be deficient at the high temperatures needed. At 3000° F. and .001 micron of mercury titanium vaporizes and the bond is completely destroyed.

In out-of-pile use of thermionic converters with nuclear reactors, the operation of the converter depends upon a high-temperature loop from the reactor. The temperatures required for successful operation of a thermionic converter are so high that liquid lithium is about the only candidate among the alkali metals for use as the heat source for such an out-of-pile converter. Even with lithium, however, for most efficient operation, the lithium should be pressurized to realize the higher temperatures desired. Fortunately, lithium is also an attractive heat source for use in space, because of its lightweight.

It is accordingly a primary object of this invention to provide new and improved bonding alloys for forming ceramic-to-metal and metal-to-metal bonds and a process for creating such bonds, whereby strong and adherent bonds are achieved that are resistant to failure at high temperatures up to at least 3000° F.

It is another object of this invention to provide new and improved bonding alloys for making high-temperature ceramic-to-metal and metal-to-metal bonds that exhibit good thermal conductivity properties and that have no deleterious effects on the electrical insulating properties of ceramics.

Another object of this invention is to provide novel and improved bonding alloys for forming ceramic-to-metal or metal to metal bonds:

(1) that are strong, adherent, and resistant to failure at high temperatures;
(2) that produce a superior fillet;
(3) that exhibit excellent flow characteristics and the ability to wet both ceramic (or nonmetallic refractory members) and refractory metals; and
(4) that are ductile at room temperature.

As used herein, the term "fillet" refers to the shape of the bonding alloy at its edges when used in a ceramic-to-metal or metal-to-metal bond or joint.

Yet another object of this invention is to provide new and improved bonding alloys that have a low vapor pressure even at very high temperatures and that even at temperatures up to at least 3000° F., are resistant to vaporization at pressures as low as .001 micron of mercury.

It is a further object of this invention to provide new and improved bonding alloys that, once formed, will maintain an effective bond at temperatures higher than the flow temperature at which the allows are formed.

A still further object of this invention is to provide new and improved bonding alloys for forming ceramic-to-metal bonds between the nonmetallic insulating member and each metal member of a trilayer for thermionic devices. The alloys of this invention thus:

(1) are strong and adherent;
(2) are resistant to bonding failure at high temperatures;
(3) yield a trilayer having excellent electrical insulating and good thermal heat conductivity characteristics; and
(4) eliminate the need for producing a metallized surface on the ceramic before bonding.

Additional objects and advantages will be set forth in part in the description that follows, and in part will be obvious from the description, or may be learned by practice of the invention, the objects and advantages being realized and attained by means of the compositions, methods and processes particularly pointed out in the appended claims.

As set forth in the description of the invention and the claims, it will be understood that the term "flow temperature" refers to the temperature at which each bonding alloy of this invention begins to melt or fuse together from its constituent elements and begins to achieve characteristics of flowability and wettability. It is a characteristic of this invention and also one of its unexpected new and useful results that once the bonding alloys are formed into bonds, such as in the ceramic-to-metal bond of a trilayer for use in a thermionic device, they will maintain strong and adherent bonds at temperatures well above their flow temperatures of formation. Although the reason for this is not well understood, it is believed this resistance to melting is in part attributable to formation of higher melting oxides of one or more of the constituent elements of the bonding alloys. The bonding alloys that finally result are thus non-eutectic and higher melting compositions than those of the original melts.

Also, as set forth in the description of the invention and in the claims, it will be understod that the term "diffusing temperature" refers to a temperature of 100° F. of more below the "flow temperature" for a particular bonding alloy. At the diffusing temperature, when the constituent elements of a bonding alloy are in the form of thin sheets of foil, or shims, or powder, diffusion will take place between the separate layers or powders of elements. Exposure of the alloy ingredients to a diffusing temperature for a suitable interval will result in very rapid formation of the bonding alloy when the temperature is increased to the flow temperature.

To achieve the foregoing objects and in accordance with its purpose, this invention embraces a high-temperature bonding alloy for joining a metal article selected from the group consisting of the refractory metals and alloys thereof to a similar refractory metal article or to a refractory ceramic body having good electrical insulating properties and good thermal conductivity characteristics at high temperatures. The bonding alloy in atomic percentages of its total composition consists essentially of from 7 to 45 atomic percent of molybdenum, from 1.5 to 15 atomic percent in the aggregate of a metal selected from the group consisting of tantalum, columbium, and mixtures thereof, and the balance esentially all zirconium with the zirconium content of the alloy being not less than 50 atomic percent.

As one of the unexpected new and useful results of the invention, the molybdenum content of the bonding alloy counteracts the otherwise undesirable corrosive effect that zirconium has on beryllium oxide, which is the preferred nonmetallic refractory member or ceramic body for use with the invention. An amount of at least 7 atomic percent molybdenum has been found necessary to effect this purpose. Conversely, if too much molybdenum is added to the bonding alloy an intermetallic compound is formed between zirconium and molybdenum that causes second phase embrittling of the alloy. The alloy then loses the desirable ductile properties it possesses in its single phase form. If more than 45 atomic percent molybdenum is added to the bonding alloy, there is danger that the intermetallic compound will be formed and the alloy undesirably embrittled. Moreover, amounts of molybdenum greater than 45 atomic percent would tend to dilute zirconium content of the alloy to an undesirable degree.

As another unexpected new and useful result of this invention, the tantalum and/or columbium content of the bonding alloy effects a dramatic improvement in its wetting capability, particularly when the alloy is used to bond beryllium oxide to a refractory metal. Until the present invention was achieved, it had been almost impossible to find any high-temperature resistant bond capable of wetting both the refractory metals and beryllium oxide or like ceramics to couple them together with a strong heat-resistant ceramic-to-metal joint. The wettability and flowability improvement afforded by the addition of tantalum or columbium to the bonding alloy is effective on both metal surfaces and ceramic surfaces. It has been found that to achieve the desired wettability and flowability characteristics it is necessary to include at least 1.5 atomic percent of tantalum and/or columbium and that it is desirable that not more than 15 atomic percent of tantalum and/or columbium be included or the ultimate bonding strength of the alloy may be deleteriously affected at high temperatures.

To achieve superior results with the bonding alloys of this invention it is preferable to include a molybdenum content of from 10 to 35 atomic percent, and in the most preferred form of the invention which gives the best possible results the alloys have a molybdenum content of from 10 to 22 atomic percent. Similarly, for superior results it is preferable to include tantalum and/or columbium in an aggregate amount of from 4 to 12 atomic percent and in the most preferred form of the invention which gives the best possible results the alloys have a tantalum and/or columbium content in an aggregate amount of from 5 to 8 atomic percent.

The alloys of this invention work particularly well in bonding beryllium oxide insulating layers to metal layers consisting essentially of the refractory metals and their alloys. For thermionic devices, beryllium oxide is the best material yet found for insulating the two metal layers of a trilayer one from the other. This is partly so because beryllium oxide is a high-temperature resistant refractory oxide that combines excellent electrical resistance with reasonably good thermal conductivity. Most of the refractory oxides, although some few may possess even better electrical resistance than beryllium oxide, exhibit relatively poor thermal conductivity properties when compared with beryllium oxide.

This invention also embraces a bonding alloy that, in the molten state, is characterized by excellent wettability and flowability, and that is capable of forming a strong, high-temperature bonded joint in which at least one component of the joint is a metal selected from the group consisting of the refractory metals and alloys thereof, and the other component is a member selected from the group consisting of beryllium oxide, the refractory metals and alloys thereof. This bonding alloy in atomic percentages of total composition consists essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content being not less than 50 atomic percent of the total composition.

This invention further comprehends a trilayer for use in thermionic devices, the trilayer comprising a first metal member, a second metal member, and a nonmetallic refractory member interposed between the two metal members, the first and second metal members comprising a metal selected from the group consisting of the refractory metals and alloys thereof, and the nonmetallic refractory member comprising a refractory oxide having good electrical insulating properties and good thermal conductivity characteristics. The trilayer also includes a bonding alloy joining the first metal member to one side of the nonmetallic refractory member and joining the second metal member to the other side of the nonmetallic refractory member in a strong, adherent and high-temperature resistant bond, the bonding alloy in atomic percentages of total composition consisting essentially of from 7 to 45 atomic percent of molybdenum, from 1.5 to 15 atomic percent in the aggregate of a metal selected from the group consisting of tantalum, columbium and mixtures thereof, the balance essentially all zirconium, the zirconium being present in an amount of at least 50 atomic percent of the total composition.

This invention also includes a process for forming a high-temperature bonded joint between two metal members or a metal member and a nonmetallic ceramic member, in which each metal member comprises a metal selected from the group consisting of the refractory metals and alloys thereof and in which the nonmetallic ceramic member comprises a refractory oxide having good insulating and thermal conductivity properties, the process comprising the steps of:

(a) placing the two members to be bonded together adjacent one another with a bonding alloy composition interposed between them to create a bonding assembly, the bonding alloy composition in atomic percentages of total composition consisting essentially of from 7 to 45 atomic percent of molybdenum, from 1.5 to 15 atomic percent in the aggregate of a metal selected from the group consisting of tantalum, columbium and mixtures thereof, and the balance essentially all zirconium, the zirconium being present in an amount of at least 50 atomic percent of the total composition;

(b) heating the bonding assembly in a nonreactive atmosphere to a diffusing temperature;

(c) further heating the bonding assembly to a flow temperature to create a bonding alloy between the members to be joined; and (d) cooling the bonding assembly to provide a metal-to-metal or ceramic-to-metal bond capable of withstanding a temperature greater than the flow temperature at which the bonding alloy is formed.

The bonding alloy is, of course, formed from the constituent elements of the bonding composition. In forming a trilayer, or in bonding together two metal members, or in bonding a metal member to a nonmetallic ceramic member, it is possible to introduce the bonding alloy composition in several different ways. For example, and preferably, the bonding alloy is preformed from its constituent elements by any of several methods well known to those skilled in the art.

The alloy could thus be formed by introducing a proportioned mixture of its constituent elements into an inert atmosphere furnace as a charge comprising a mixture of powders, large grains, shot, sponge or similar forms of the elemental metals. The charge would be heated in the inert atmosphere by either a nonconsumable or a consumable electrode process to melt it and form the bonding alloy. The resulting cast ingot would then be reduced by conventional hot or cold working methods to thin foil or sheet. Ideally, the bonding alloy in the form of such thin foil or sheet would be interposed between the two metal members or the metal member and nonmetallic ceramic member and the bonding process carried out as described above.

Although the best possible bond is created when a preformed bonding alloy foil or shim is used, the additional step of preforming the bonding alloy is more time-consuming and expensive than creating the bonding alloy during the bonding process itself. The use of the preformed bonding alloys thus only becomes practical in large-scale operations where substantial qualities of bonding alloy will be used.

A more direct and practical method, particularly for small-scale operations, is to form the bonding alloy simultaneously with formation of the bond or joint itself. When this method is used, it is preferred that the constituent elements of the bonding alloy be introduced in the form of separate foils, shims or sheets of each constituent element. A bonding assembly is created by interleaving and stacking separate foils of molybdenum, zirconium, and tantalum and/or columbium between the members to be joined together.

It is also possible to create the bonding alloy by making a powder mixture of the constituent elements. Each of the constituent elements is introduced as a powdered metal in the right proportion for the particular bonding composition being used. The powder mixture is then interposed between the members to be joined before heating. This method is, however, less preferred than the method in which foils, shims or sheets of the elemental constituents are used.

In heating bonding assemblies or trilayer assemblies to form metal-to-metal or ceramic-to-metal bonds or joints, the heating should be conducted in a nonreactive atmosphere. It will be understood that the term "nonreactive atmosphere" refers to an atmosphere from which substantially all oxygen, nitrogen, and carbon have been removed. Typically such an atmosphere would be either a vacuum or an inert gas atmosphere, such as an argon atmosphere. Inert atmosphere furnaces will known to those skilled in the art may be used for heating the prepared assemblies from which the trilayers or bonded joints of this invention are created.

Although the reactive elements titanium and zirconium are closely related in many of their properties, titanium is not suitable for use in this invention as an equivalent for zirconium or even as one of the consttiuent elements of the bonding alloy. The vapor pressure of titanium is too high to withstand the use temperatures and pressures needed for many thermionic converters. Titanium would be rapidly lost by vaporization in the vacuum cover atmospheres at the high temperatures used with thermionic devices, and such titanium loss, if titanium were present as a substantial constituent of the alloy, would quickly result in failure of the bonding alloy. An experimental bonding alloy containing titanium thus failed after 65 hours at 2750° F. in a vacuum atmosphere of .001 micron. The presence of titanium in the bonding alloy, however, in very small or incidental amounts as an impurity will do no harm.

Unmodified zirconium will not give a satisfactory bond in the preferred trilayers of this invention, which use beryllium oxide as the nonmetallic ceramic member. And beryllium oxide is highly preferred as the central member in the trilayer of this invention, because it combines excellent electrical resistance with good thermal conductivity.

When an attempt was made to use unmodified zirconium as a bonding metal for joining beryllium oxide to a metal member, results were unsatisfactory. The unmodified zirconium had a strong corrosive effect on beryllium oxide. As one of the unexpected new and useful results of this invention, however, it has been found that by addition of molybdenum to zirconium two important benefits are achieved:

(1) the melting or flow temperature of the bonding alloy composition is lowered, and
(2) the corrosive effect of zirconium on beryllium oxide is greatly reduced and brought within acceptable limits.

In accordance with the invention both of these results are interdependent and complementary. Because the corrosive effect of zirconium increases with temperature, molybdenum, by lowering the melting temperature of the bonding alloy composition, still further reduces corrosion, in this way as well as by diluting the zirconium content.

Further in accordance with the invention, the wetting capabilities of the bonding alloy composition are dramatically and unexpectedly improved by the addition of from 1.5 to 15 atomic percent in the aggregate of a metal selected from the group consisting of tantalum, columbium, and mixtures thereof.

In a preferred form, the bonding alloy composition of this invention consists essentially of about 36 atomic percent of molybdenum, about 7 atomic percent of tantalum, and the balance essentially all zirconium.

It is an important attribute of this invention that once a bond has been formed with the bonding alloy it will retain its strength, adherency and bonding properties even when heated beyond its flow temperature. Although this unexpected new and useful result of the invention is not well understood, it may be attributed in part to creation of zirconium oxide during forming of the bond. Zirconium oxide probably raises the flow temperature of the composition by removing some of elemental zirconium from the bonding alloy to create a non-eutectic higher melting alloy.

Aluminum oxide is not suitable for forming the nonmetallic ceramic member of the trilayers of this invention. Although aluminum oxide is an excellent electrical insulator, its thermal conductivity is not nearly as good as beryllium oxide, and the corrosive effects of zirconium are even greater with aluminum oxide than with beryllium oxide. Beryllium oxide is considered a much more desirable insulator, or nonmetallic ceramic member, than aluminum oxide in the trilayers of this invention for at least the following reasons:

(1) beryllium oxide is more stable than aluminum oxide;
(2) beryllium oxide has a higher melting point than aluminum oxide; and
(3) beryllium oxide has a much higher thermal conductivity and provides much better heat transfer characteristics than aluminum oxide.

Aluminum oxide is, however, useful in thermionic converters to form high-temperature hermetic seals to prevent the escape of cesium vapor used in the interelectrode spacing between emitter and collector.

As previously discussed, in the process of forming the bonding alloy in situ, the bonding assembly should be held at a diffusing temperature that is about 100° F. below the melting or flow temperature of the alloy. At this temperature an incipient alloy is formed by diffusion, particularly when thin foils of the constituent elements are used. By maintaining the bonding assembly at a diffusing temperature that is well below the flow temperature corrosion of beryllium oxide by zirconium is kept low. This diffusing step usually takes from 10 to 60 minutes.

In the second heating step of the process the temperature is raised to the flow or melting temperature of the bonding alloy, but if the diffusing step has been carried out first, the alloy zirconium content will have been diluted and the bonding alloy can be formed quickly at the flow temperature without appreciable corrosion losses. The flow temperature is a critical temperature at which the reaction between constituent elements to form the bonding alloy proceeds rapidly. The reaction is particularly rapid when a diffusing step has been used before the alloy is raised to the flow temperature.

Flow temperatures for the bonding alloys of this invention are from about 2650 to 3300° F.

When a trilayer or bond between a metal member and a non-metallic ceramic member is formed, it is important that it be cooled slowly. This avoids dislodgement of the parts that might be caused by differences in the coefficients of thermal expansion between the ceramic and metal. Conversely, however, the rate of heating is not important before the bond is formed.

For a clearer understanding of the invention, specific examples are set forth below. These examples are merely illustrative and are not to be understood as limiting the scope and underlying principles of the invention in any way.

EXAMPLE 1

A small alloy plate consisting essentially of tungsten and 26% of rhenium by weight (W–26Re) and measuring approximately 2" x 0.75" x .05" and a tantalum plate of the same dimensions were bonded with a strong, adherent, high-temperature alloy bond to opposite sides of a beryllium oxide plate measuring approximately 2" x 0.5" x 0.25" as follows.

A number of sheets of foil were selected to provide two stacks of foil with each stack having approximately the following composition in atomic percentages of total foil in the stack:

7 atomic percent of tantalum foil,
36 atomic percent of molybdenum foil, and
57 atomic percent of zirconium foil.

Each foil was approximately one mil in thickness. The foils were stacked or interleaved in a manner to alternate foils of the different constituent elements to the extent practicable. One stack of foils was then interposed between the W–26Re alloy plate and the beryllium oxide plate, and the other stack was interposed between the tantalum plate and the other side of the beryllium oxide plate to form a trilayer assembly. Before stacking, the beryllium oxide plate and zirconium, molybdenum and tantalum foils were cleaned with acetone, and the W–26Re and tantalum plates were chemically cleaned.

The stacked trilayer assembly was placed in a vacuum furnace, evacuated to .001 micron and a weight of 5 lbs. was placed on the upper metal member to create pressure on the stack and ensure intimate contact between the parts. The vacuum furnace was then heated to a diffusing temperature of about 2500° F. and held at this temperature for about 30 minutes to cause substantial diffusion to take place between the separate foils of the bonding alloy composition. The trilayer was then heated to 2770° F. for 10 minutes to cause further and more rapid diffusion between the foils of the bonding alloy composition. Finally, the furnace was heated to a temperature of about 2870° F.±50° F. and held at this temperature for a short time during which the zirconium, molybdenum and tantalum foils reacted completely to form a substantially homogeneous bonding alloy. The trilayer assembly was then slowly cooled so that the tungsten-rhenium and tantalum plates would not dislodge from the beryllium oxide plate.

This planar trilayer was then tested for 100 hours at 2750° F. and showed almost no physical change.

Even after testing for 100 hours at 2750° F., the bond formed between the metal members and the beryllium oxide was strong, adherent, and essentially unchanged from its original state.

EXAMPLE 2

A trilayer was formed as in Example 1 except that a second tantalum plate was used in place of the W–26Re plate of Example 1. The bonds on this trilayer survived a temperature of 3000° F. for 5 hours without any perceptible change.

EXAMPLE 3

A cylindrical trilayer was formed using a tube of W–26Re alloy as the outer member and a tube of tantalum as the inner member with a tube of beryllium oxide between them. The beryllium oxide member had a tube wall thickness of 14 mils. This cylindrical trilayer was formed as in Example 1 using the bonding alloy of Example 1. The parts were carefully machined to fit closely together with foil sheets of the alloy constituent elements between them so that an intimate contact was provided between adjacent foil sheets. The thickness of each foil sheet used was about 1 mil.

Results were as set forth in Example 1.

EXAMPLE 4

Two small plates of columbium were placed with their ends adjacent each other and a bonding alloy having the composition of Example 1 was placed between their abutting ends. The bonding alloy was then fused as in Example 1.

A strong adherent bond was obtained between the abutting ends of the plates, and the joint suffered no deterioration when exposed to a temperature of 3000° F. for 100 hours.

In addition to the foregoing examples, the following embodiments of the bonding alloy composition also satisfy the objects of the invention and achieve its new and useful result:

| Example | In atomic percent of total composition | | | |
| --- | --- | --- | --- | --- |
| | Mo | Ta | Cb | Zr |
| 5 | 7 | 15 | | Bal. |
| 6 | 10 | 8 | 7 | Bal. |
| 7 | 11 | 5 | 5 | Bal. |
| 8 | 15 | 7 | | Bal. |
| 9 | 16 | | 7 | Bal. |
| 10 | 20 | 5 | | Bal. |
| 11 | 21 | | 5 | Bal. |
| 12 | 22 | 5 | 5 | Bal. |
| 13 | 22 | 10 | | Bal. |
| 14 | 24 | 5 | 3 | Bal. |
| 15 | 25 | 4 | 5 | Bal. |
| 16 | 26 | | 7 | Bal. |
| 17 | 27 | 4 | | Bal. |
| 18 | 27 | 12 | | Bal. |
| 19 | 25 | | 15 | Bal. |
| 20 | 30 | 5 | | Bal. |
| 21 | 32 | | 5 | Bal. |
| 22 | 31 | 10 | | Bal. |
| 23 | 33 | 3 | | Bal. |
| 24 | 32 | 4 | 4 | Bal. |
| 25 | 35 | 2 | | Bal. |
| 26 | 36 | 14 | | Bal. |
| 27 | 35 | 7 | | Bal. |
| 28 | 36 | | 7 | Bal. |
| 29 | 40 | 7 | | Bal. |
| 30 | 41 | | 8 | Bal. |
| 31 | 42 | 1.5 | | Bal. |
| 32 | 41 | 1.5 | 1.5 | Bal. |
| 33 | 42 | | 3 | Bal. |
| 34 | 45 | 4 | | Bal. |
| 35 | 44 | | 4 | Bal. |
| 36 | 45 | 2 | 2 | Bal. |
| 37 | 44 | 1.5 | | Bal. |
| 38 | 45 | | 1.5 | Bal. |
| 39 | 7 | 2 | | Bal. |
| 40 | 8 | | 2 | Bal. |

What is claimed is:
1. In a trilayer for thermionic devices comprising a nonmetallic refractory electrical insulating layer interposed between two metal layers, the insulating layer being bonded to each metal layer by a metallic bond, the improvement that comprises bonding the insulating layer to each metal layer with a bonding alloy consisting essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content of the alloy being not less than 50 atomic percent of the total composition.

2. A process of providing a trilayer comprising a nonmetallic refractory layer interposed between two metal layers for use in high-temperature thermionic devices, the process comprising the steps of:
  (a) providing a beryllium oxide layer between two metal layers, each metal layer being selected from the group consisting of the refractory metals and alloys thereof;
  (b) placing a bonding alloy composition between one metal layer and one side of the beryllium oxide layer and between the other metal layer and the other side of the beryllum oxide layer to create a trilayer assembly, the bonding alloy composition consisting essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content of the alloy being not less than 50 atomic percent of the total composition;
  (c) heating the trilayer assembly in a vacuum of inert atmosphere furnace to a diffusing temperature; and
  (d) subsequently heating the trilayer assembly to a flow temperature sufficient to melt the bonding alloy, whereby a strong metallic bond is formed between the first metal layer and the beryllium oxide layer and between the second metal layer and the beryllium oxide layer that retains strong bonding properties at temperatures up to at least 3000° F.

3. A process for creating a high-temperature metallic bond between beryllium oxide and a metal having a melting point equal to or higher than that of chromium and selected from the group consisting of the refractory metals and alloys thereof, the process comprising the steps of:
  (a) placing a bonding alloy composition between the beryllium oxide and the metal to create a bonding assembly, the bonding alloy composition consisting essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content of the alloy being not less than 50 atomic percent of the total composition;
  (b) heating the bond assembly to a diffusing temperature; and
  (c) further heating the bonding assembly to a flow temperature sufficient to melt the bonding alloy composition, whereby a strong, adherent bond is formed between the beryllium oxide and the metal that retains its bonding properties at temperatures higher than the flow temperature.

4. The invention as defined in claim 3, in which the bonding alloy composition is formed from thin foil shims of its constituent elements.

5. The invention as defined in claim 3, in which the bonding alloy is formed from finely divided particles of its constituent elements.

6. A process for forming a high-temperature bonded joint between two metal articles, each metal article consisting essentially of a metal having a melting point equal to or higher than that of chromium and selected from the group consisting of the refractory metals and alloys thereof, the process comprising the steps of:
  (a) placing the metal articles together with a bonding alloy composition interposed between them to create a bonding assembly, the bonding alloy composition consisting essentially of from 7 to 45 atomic present of the molybdenum, from 1.5 atomic percent in the aggregate of a metal selected from the group consisting of tantalum, columbium, and mixture thereof, and the balance essentially all zirconium with the zirconium content of the alloy being not less than 50 atomic percent of the total composition;
  (b) heating the bonding assembly in a nonreactive atmosphere to a diffusing temperature at least 100° F. below the flow temperautre of the bonding alloy and holding the bonding assembly at this temperature for at least 10 minutes;
  (c) further heating the bonding assembly to a flow temperature to create a bonding alloy between the members to be joined; and
  (d) cooling the bonding assembly to provide a metal-to-metal bond capable of withstanding a temperature greater than the flow temperature of the bonding alloy.

7. A process for making a bonded trilayer structure, the trilayer structure comprising a first metal layer and a second metal layer spaced apart with a ceramic refractory layer between them, the process comprising the steps of:
  (a) assembling a composite sandwich consisting essentially of (i) the first metal layer, (ii) a first layer of a bonding alloy composition disposed in contact with the first metal layer, (iii) the ceramic refractory layer disposed in contact with the first layer of the bonding alloy composition, (iv) a second layer of the bonding alloy composition disposed in contact with the ceramic refractory layer, and (v) the second metal layer disposed in contact with the second layer of the bonding alloy composition, the bonding alloy composition consisting essentially of zirconium, molybdenum and a metal selected from the group consisting of tantalum, columbium, and mixtures thereof;
  (b) heating the composite sandwich to a diffusing temperature below the flow temperature of the bonding alloy composition for a length of time sufficient to cause substantial diffusion to take place between the constituent elements of the bonding alloy composition;
  (c) heating the composite sandwich to a bonding temperature at least as high as the flow temperature of the bonding alloy composition to cause the bonding alloy composition to thoroughly wet the adjacent surfaces of the metal and ceramic refractory layers to bond the composite sandwich together; and
  (d) cooling the composite sandwich to provide a trilayer structure with bonds capable of withstanding temperatures greater than the flow temperature without failure.

8. The invention as defined in claim 7, in which the bonding alloy composition consists essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content of the alloy being not less than 50 atomic percent of the total composition.

9. The invention as defined in claim 7, in which the bonding alloy composition consists essentially of from 10 to 35 atomic percent of molybdenum, from 4 to 12 atomic percent in the aggregate of a metal selected from the group consisting of tantalum, columbium, and mixtures thereof, and the balance essentially all zirconium.

10. The invention as defined in claim 7, in which the bonding alloy composition consists essentially of from 10 to 22 atomic percent of molybdenum, from 5 to 8 atomic percent in the aggregate of a metal selected from the group consisting of tantalum, columbium, and mixtures thereof, and the balance essentially all zirconium.

11. A process for creating a high-temperature metallic bond between a nonmetallic refractory member and a metal having a melting point equal to or higher than that of chromium and selected from the group consisting of the refractory metals and alloys thereof, the process comprising steps of:
   (a) placing a preformed bonding alloy composition between the nonmetallic refractory member and the metal to create a bonding assembly, the preformed bonding alloy composition consisting essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content of the alloy being not less than 50 atomic percent of the total composition;
   (b) heating the bonding assembly to the flow temperature of the preformed alloy composition to melt the alloy composition; and
   (c) cooling the bonding assembly, whereby a strong adherent alloy bond is formed between the nonmetallic refractory member and the metal that retains its bonding properties at temperatures higher than the flow temperature of the preformed bonding alloy composition.

12. A process for forming a high-temperature bonded joint between two metal articles, each metal article consisting essentially of a metal having a melting point equal to or higher than that of chromium and selected from the group consisting of the refractory metals and alloys thereof, the process comprising the steps of:
   (a) placing the metal articles together with a preformed bonding alloy composition interposed between them, the bonding alloy composition consisting essentially of from 7 to 45 atomic percent of molybdenum, from 1.5 to 15 atomic percent in the aggregate of a metal selected from the group consisting of tantalum, columbium, and mixtures thereof, and the balance essentially all zirconium with the zirconium content of the alloy being not less than 50 atomic percent of the total composition;
   (b) heating the bonding assembly in a nonreactive atmosphere to the flow temperature of the preformed bonding alloy composition to melt the bonding alloy composition; and
   (c) cooling the bonding assembly to provide a metal-to-metal bond capable of withstanding a temperature greater than the flow temperature of the bonding alloy composition.

13. A process for providing a trilayer having a tubular configuration and comprising a tube-shaped nonmetallic refractory member interposed between a first tube-shaped metal member and a second tube-shaped metal member for use in high-temperature thermionic devices and the like, the refractory member having good electrical insulating and thermal conductivity properties, the metal member having a melting point equal to or higher than that of chromium and selected from the group consisting of the refractory metals and their alloys, the refractory member having a diameter greater than the first metal member and less than the second metal member, whereby the first metal member can be placed inside the refractory member and the refractory member can be placed inside the second metal member with clearance space between the first metal member and the refractory member and with clearance space between the second metal member and the refractory member; the process comprising the steps of:
   (a) placing the first metal member inside the refractory member and placing the refractory member and first metal member inside the second metal member;
   (b) positioning a bonding alloy composition in the clearance space between the first metal member and refractory member and in the clearance space between the second metal member and refractory member to create a trilayer assembly, the bonding alloy composition consisting essentially of from 7 to 45 atomic percent of molybdenum, from 1.5 to 15 atomic percent in the aggregate of a metal selected from the group consisting of tantalum, columbium and mixtures thereof, and the balance essentially all zirconium with the zirconium content of the alloy being not less than 50 atomic percent of the total composition;
   (c) heating the trilayer assembly to a diffusing temperature in a nonreactive atmosphere;
   (d) further heating the trilayer assembly to a flow temperature sufficient to fuse the bonding alloy composition, whereby a strong adherent bond is formed between the refractory member and each metal member; and
   (e) cooling the trilayer assembly to provide a trilayer with a ceramic-to-metal bond between the refractory member and each metal member capable of withstanding a temperature greater than the flow temperature of the bonding alloy composition and of retaining its strength and bonding properties at such temperature.

References Cited

UNITED STATES PATENTS 3,046,650  7/1962  Heestand et al. _____ 29—488

OTHER REFERENCES

Murakami et al.: "An Investigation of the Zirconium-Niobium-Molybdenum System," March 1963, Engineering Research Institute, Kyoto University, Kyoto, Japan, pages 3–17.

CHARLIE T. MOON, Primary Examiner

R. J. SHORE, Assistant Examiner

U.S. Cl. X.R.

29—198, 471.9, 472.3, 501